US008674958B1

(12) United States Patent
Kravets et al.

(10) Patent No.: US 8,674,958 B1
(45) Date of Patent: Mar. 18, 2014

(54) METHOD AND APPARATUS FOR ACCURATE COORDINATE CALCULATION OF OBJECTS IN TOUCH APPLICATIONS

(71) Applicant: Cypress Semiconductor Corporation, San Jose, CA (US)

(72) Inventors: Igor Kravets, Lviv (UA); Vasyl Mandziy, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/916,485

(22) Filed: Jun. 12, 2013

Related U.S. Application Data

(60) Provisional application No. 61/777,087, filed on Mar. 12, 2013.

(51) Int. Cl.
*G06F 3/041* (2006.01)
(52) U.S. Cl.
USPC .......................................................... 345/173
(58) Field of Classification Search
USPC .................... 345/156, 173; 178/18.01–18.06
See application file for complete search history.

(56) References Cited

U.S. PATENT DOCUMENTS

| | | | |
|---|---|---|---|
| 6,888,536 B2 * | 5/2005 | Westerman et al. | .......... 345/173 |
| 7,643,010 B2 | 1/2010 | Westerman et al. | |
| 7,932,897 B2 | 4/2011 | Elias et al. | |
| 8,130,203 B2 | 3/2012 | Westerman | |
| 8,416,198 B2 | 4/2013 | Rathnam et al. | |
| 2007/0097096 A1* | 5/2007 | Rosenberg | ..................... 345/173 |
| 2007/0229468 A1* | 10/2007 | Peng et al. | ..................... 345/173 |
| 2008/0167081 A1 | 7/2008 | Eng | |
| 2010/0177048 A1 | 7/2010 | Semenets et al. | |
| 2010/0220062 A1 | 9/2010 | Antila | |
| 2012/0235937 A1 | 9/2012 | Sleeman et al. | |

FOREIGN PATENT DOCUMENTS

CA        2666026 A1    12/2009
WO    2012048380 A1     4/2012

* cited by examiner

*Primary Examiner* — Yong H Sim

(57) ABSTRACT

Systems and methods and techniques are disclosed for determining the position and size of an object touching a touch-sensitive display. One embodiment may comprise a set of reference templates—where each reference template is a model and/or data associated with a reference object of a given size. The reference templates may be determined on a priori basis—possibly created during a training phase for the touch display system. The training phase may be performed by stepping an object across a touch display and noting its actuation signal—while the modeling step may be performed by calculating actuation signals based on a model of objects of a given size. With an actual object, its position and size may be determined, calculated and/or estimated by solving a set of inverse finger response functions—e.g., as a set of over-determined linear equations.

20 Claims, 11 Drawing Sheets

METHOD AND APPARATUS FOR ACCURATE COORDINATE CALCULATION OF OBJECTS IN TOUCH APPLICATIONS

CROSS-REFERENCE TO RELATED APPLICATIONS

This application claims the priority benefit of U.S. Provisional Application No. 61/777,087, filed Mar. 12, 2013, which is incorporated herein by reference in its entirety.

BACKGROUND

In existing touch screen devices, insufficient accuracy and linearity of calculated finger position coordinates tend to affect touch screen applications. Such touch devices may use standard methods to calculate reported positions.—e.g. virtual sensors, centroid, linear interpolation algorithms and others. In addition, accuracy and linearity tend to be most problematic when a finger is located near the edge or corners of the touch screen.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1A:
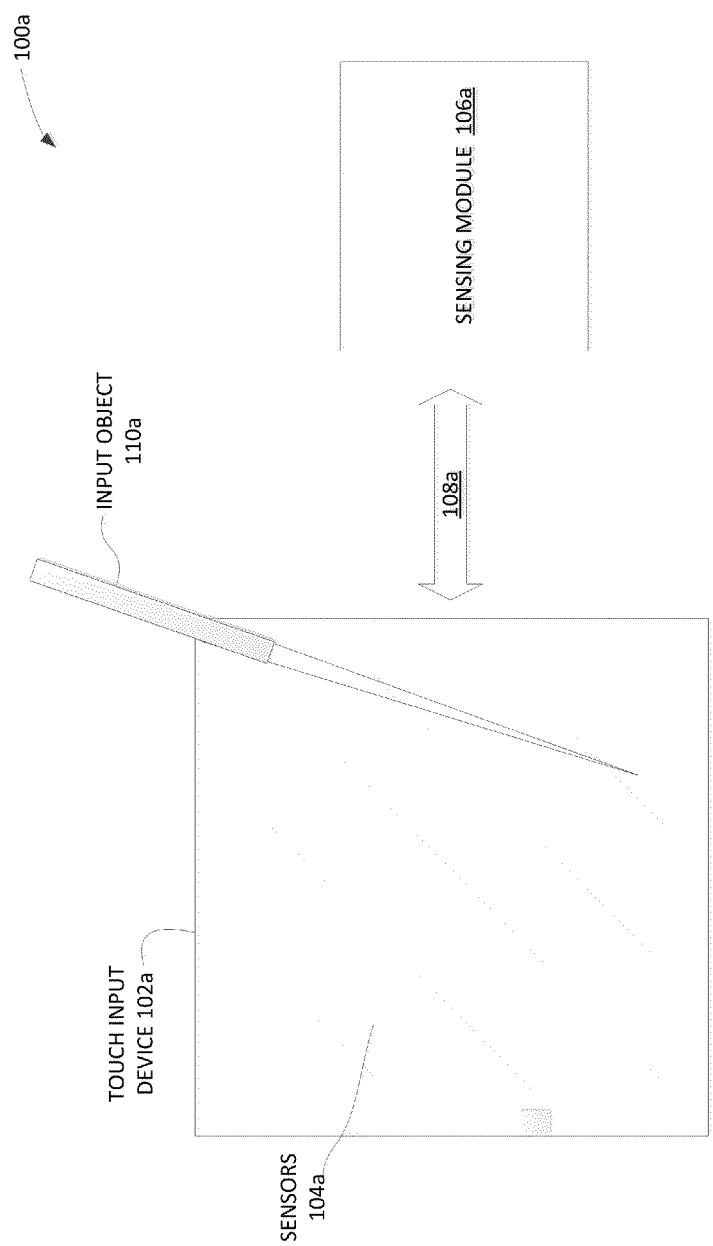
FIGS. 1A, 1B and 1C depict three embodiments of general environments and/or computer systems which may be suitable to work together with and/or host capacitive touch screen systems as made in accordance with the principles of the present application.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component", "system", "interface", "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Overview

The following presents a simplified overview of the innovation in order to provide a basic understanding of some aspects described herein.

Systems and methods and techniques are disclosed for determining the position and size of an object touching a touch-sensitive display panel. One embodiment may comprise a set of reference templates—where each reference template is a model and/or data associated with a reference object of a given size. The reference templates may be determined on a priori basis—possibly created during a training phase for the touch display system. The training phase may be performed by stepping an object across a touch display and noting its actuation signal—while the modeling step may be performed by calculating actuation signals based on a model of objects of a given size. With an actual object, its position and size may be determined, calculated and/or estimated by solving a set of inverse finger response functions—e.g., as a set of over-determined linear equations.

In addition, systems and methods improving the accuracy of object recognition systems are provided. A recognition system may comprise an apparatus for finger position to estimate finger size and calculate coordinates with high accuracy in touch applications—e.g., one of which may be a touch screen device. The touch screen device may comprises a controller and/or a method to use a priori information about finger response shapes estimated during a training process to obtain more reliable finger position coordinates. The system may allow high accuracy estimation of finger size to obtain a smooth and reliable trajectory for finger tracking. The system may also obtain precise and accurate results for the full touch display field with a solution to edge and corner tracking problems. Such a system may affect a method for finger position estimation to improve the accuracy of standard methods of finger position estimation (e.g. centroid, linear interpolation algorithms and others).

In one embodiment, a method for determining the position of object is given, where the object may produce an actuation signal upon a touch sensitive display, the method comprising: receiving a set of reference templates, each reference template comprising data associated with an actuation signal initiated by a reference object touching the touch sensitive display; receiving a first actuation signal, the first actuation signal associated with a touch produced by a first object upon the touch sensitive display; determining whether the first actuation signal meets a desired threshold signal value; if the first actuation signal meets the desired threshold signal value, determining the set of boundary points substantially near the first actuation signal; calculating the position of the first object; and wherein calculating the position further comprises solving a set of equations, the equations being functions of the reference templates.

In another embodiment a touch screen device is presented comprising: a touch-sensitive display field; a controller capable of executing computer readable instructions for determining the position of object, the object producing an actuation signal upon a touch sensitive display. The computer readable instructions are substantially the method as recited above.

In another embodiment, a controller is presented where the controller is capable of receiving the actuation signals as described and capable of performing the computer readable instructions as recited above.

General Environment for Capacitive Touch Screen Systems

Figure 1B:
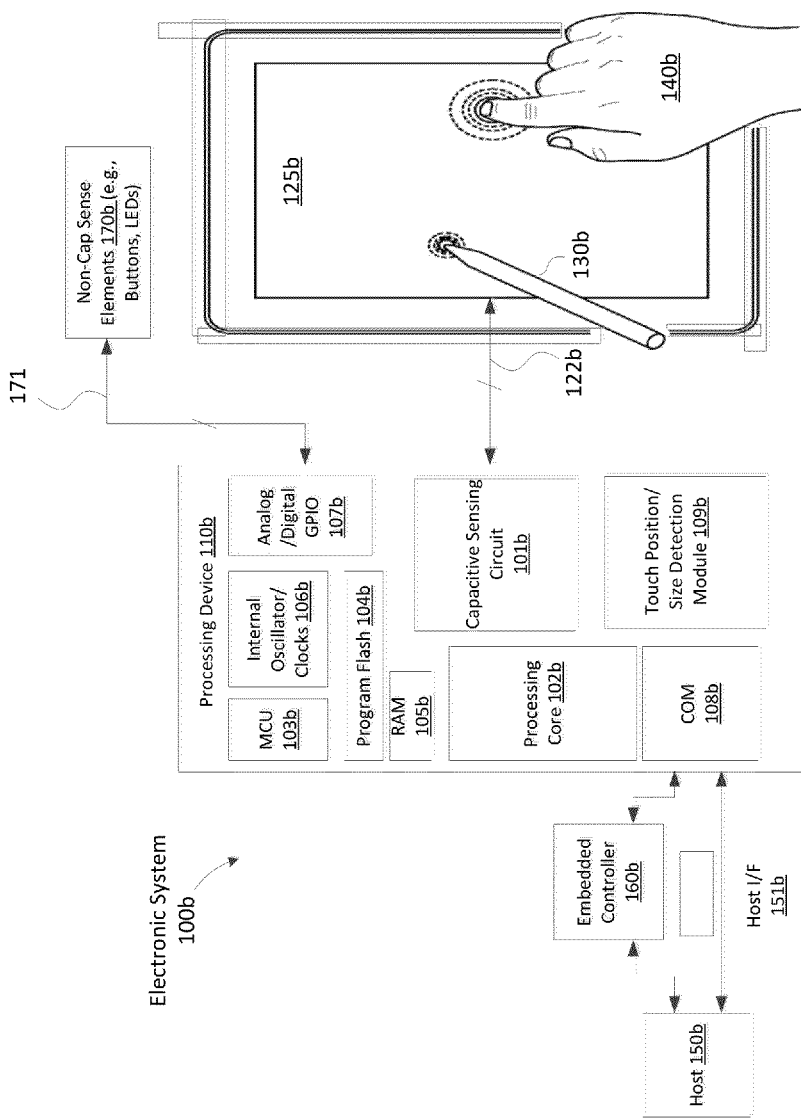
Figure 1C:
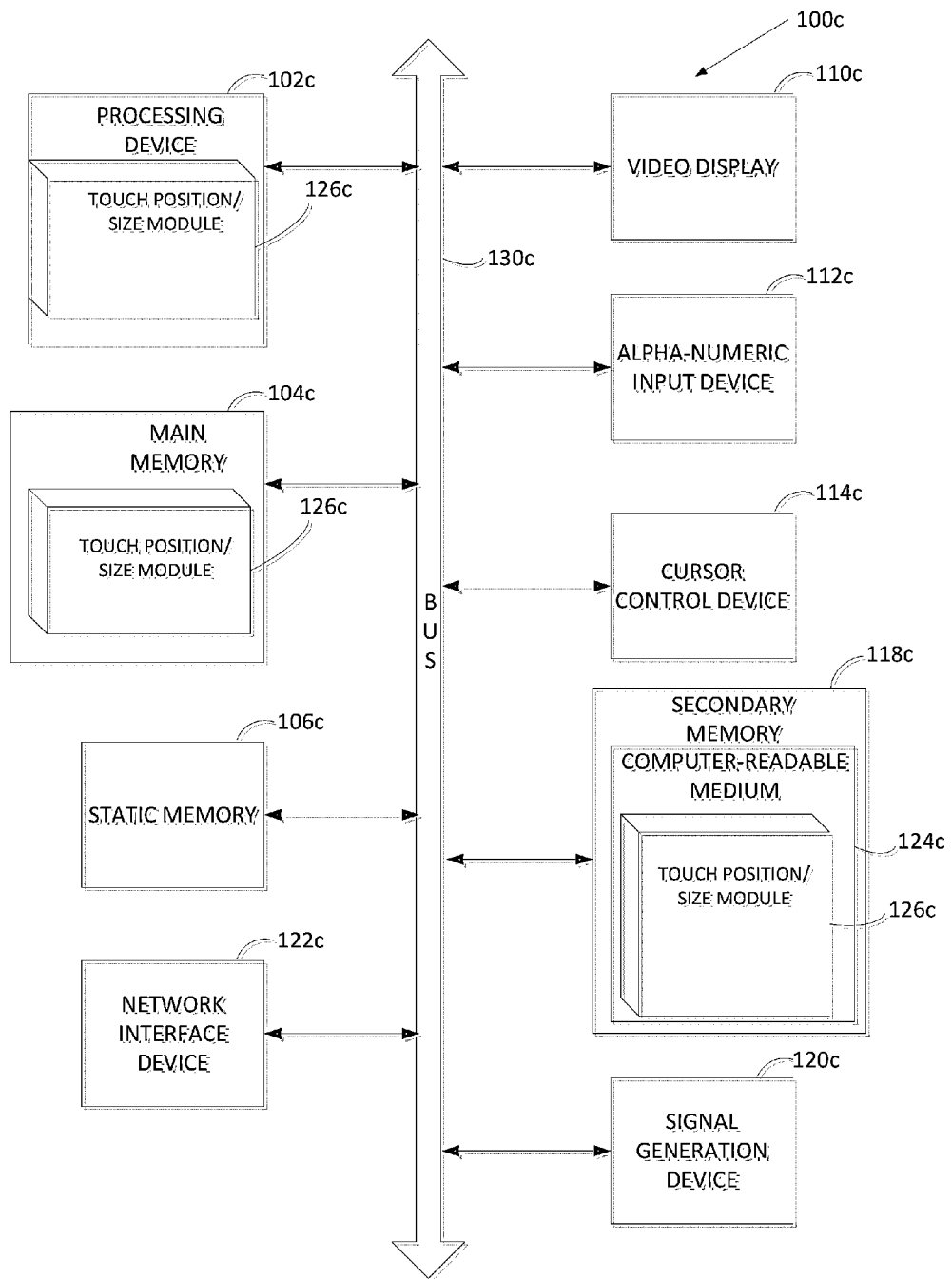

Reference will now be made to FIGS. 1A, 1B and 1C. FIGS. 1A, 1B and 1C depict three general environments and/or computer systems which may be suitable to work together with and/or host capacitive touch screen systems. These computer systems may also be suitable embodiments that work with and/or host touch position/size modules or techniques—as made in accordance with the principles of the present application. It should be appreciated that other computer systems that host capacitive touch screen systems are possible (and may be some combination of features of the three embodiments of FIGS. 1A, 1B and 1C) and that the scope of the present application encompasses all such computer systems and/or environments.

FIG. 1A is a block diagram illustrating a sensing system 100a, in accordance with various embodiments. The sensing system 100a includes a touch input device 102a coupled with a sensing module 106a. The touch input device 102a receives input from a user through an input object 110a (e.g., a stylus, a finger, or any other object used to provide input). The touch input device 102a may include a touch pad, a touchscreen, or any touch interface. In various embodiments, the sensing system 100a may provide the functionality of a touchscreen, a touchpad, a slider, a button, a switch, a level sensor, a proximity sensor, a displacement sensor, a combination thereof, or provide some other functionality based on a detection of a user input. As will be discussed in the context of FIG. 3, sensing module 106a may comprise a touch position/size module to affect the techniques of the present application.

The touch input device 102a includes sensors 104a. In various example embodiments, the sensors 104a may include one or more of light-sensitive elements, light emitting elements, photo-sensitive elements, pressure sensitive elements, and/or capacitive sensor elements. In some embodiments, the sensors 104a are embedded into an image display of the touch input device 102a. This is sometimes referred to as in-cell sensing. For example, a photosensitive element may be embedded into each display pixel of the image display. The photosensitive elements sense light reflected by an input object back into the cell.

The input object 110a is shown to be proximate to or in contact with the touch input device 102a and is used to provide input to the touch input device 102a. In this example, the input object 110a is a stylus. In an embodiment, the diameter of the stylus is around 1-mm, which is considerably less than the diameter of a typical finger. The input object 110a may be a non-conductive object, a conductive object, and/or may produce light or other energy to be sensed through the sensors 104a, without departing from the claimed subject matter. In an embodiment, the input object 110a is passive meaning that it is not electrically powered to provide input to the touch input device 102a. Alternatively or additionally, the input object 110a may be active meaning that it is electrically powered to provide input to the touch input device 102a. The input object 110a may be fixed in position or moveable in position relative to the touch input device 102a. For example, a user may move the input object 110a relative to the touch input device 102a. The user may include a human, a mechanism, a machine, and/or programmed instructions. Alternatively or additionally, the touch input device 102a may be allowed to move relative to a fixed or movable input object 110a.

The sensing module 106a senses or detects, using the sensors 104a, a presence of one or more input objects proximate or in contact with one or more of the sensors 104a of the touch input device 102a. The sensing module 106a may perform operations to sense, using the sensors 104a, signals indicating the presence of the one or more input objects (e.g., the input object 110a). Depending on the type of sensors used and what properties they sense, a sensor signal may indicate a pressure applied to the touch input device 102a, light (e.g., infrared light) associated with an input object, an image associated with an input object, a capacitance of the sensors 104a and/or a change in capacitance of one or more of the sensors 104a when an input object is proximate to or in contact with the touch input device 102a. The transmission media 108a may include any medium appropriate for the scan operation and through which the sensor signals may be conveyed. For some embodiments, the transmission media 108a includes metal traces (e.g., copper wire) coupled to the sensors.

FIG. 1B is one embodiment of an electronic system 100b having a processing device 110b that may host touch position/size module 109b—as described in greater detail herein.

The processing device 110b is configured to detect one or more touches on a touch-sensing device, such as the capacitive sense array 125b. The processing device can detect conductive objects, such as touch objects 140b (fingers or passive styluses), an active stylus 130b, or any combination thereof. The capacitance-sensing circuit 101b can measure touch data on the capacitive sense array 125b. The touch data may be represented as multiple cells, each cell representing an intersection of sense elements (e.g., electrodes) of the capacitive sense array 125b. In another embodiment, the touch data is a 2D capacitive image of the capacitive sense array 125b. In one embodiment, when the capacitance-sensing circuit 101b measures mutual capacitance of the touch-sensing device (e.g., capacitive sense array 125b), the capacitance-sensing circuit 101b obtains a 2D capacitive image of the touch-sensing device and processes the data for peaks and positional information. In another embodiment, the processing device 110b is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 100b includes processing device 110b, capacitive sense array 125b, stylus 130b, host processor 150b, embedded controller 160b, and non-capacitive sense elements 170b. The capacitive sense elements are electrodes of conductive material, such as copper. The sense elements may also be part of an ITO panel. The capacitive sense elements can be configurable to allow the capacitive-sensing circuit 101b to measure self-capacitance, mutual capacitance, or any combination thereof. Self-capacitance scanning is a method of detecting the presence of a conductive object by measuring the relative capacitance to ground. For example, using self-capacitance scanning, every row and column is scanned individually resulting in R+C scans. Mutual-capacitance scanning is a method of detecting the presence of a conductive object by measuring the relative capacitance between two electrodes (transmit (TX) electrodes and receive (RX) electrodes). For example, using mutual-capacitance scanning, each intersection (TX/RX intersection) is scanned. However, in some cases, the RX electrodes can be grouped together, resulting in NumRXGroups*TX scans. In the depicted embodiment, the electronic system 100b includes the capacitive sense array 125b coupled to the processing device 110b via bus 122b. The capacitive sense array 125b may include a multi-dimension capacitive sense array. The multi-dimension sense array includes multiple sense elements, organized as rows and columns. In another embodiment, the capacitive sense array 125b operates as an all-points-addressable ("APA") mutual capacitive sense array. In another embodiment, the capacitive sense array 125b operates as a coupled-charge receiver. In another embodiment, the capacitive sense array 125b is non-transparent capacitive sense array (e.g., PC touchpad). The capacitive sense array 125b may be disposed to have a flat surface profile. Alternatively, the capacitive sense array 125b may have non-flat surface profiles. Alternatively, other configurations of capacitive sense arrays may be used. For example, instead of vertical columns and horizontal rows, the capacitive sense array 125b may have a hexagon arrangement, or the like, as would be appreciated by one of ordinary skill in the art having the benefit of this disclosure. In one embodiment, the capacitive sense array 125b may be included in an ITO panel or a touch screen panel.

The operations and configurations of the processing device 110b and the capacitive sense array 125b for detecting and tracking the touch object 140b and stylus 130b are described herein. In short, the processing device 110b is configurable to detect a presence of the touch object 140b, a presence of a stylus 130b on the capacitive sense array 125b, or any combination thereof. The processing device 110b may detect and track the stylus 130b and the touch object 140b individually on the capacitive sense array 125b. In one embodiment, the processing device 110b can detect and track both the stylus 130b and touch object 140b concurrently on the capacitive sense array 125b. If the touching object is an active stylus, in one embodiment, the active stylus 130b is configurable to operate as the timing "master," and the processing device 110b adjusts the timing of the capacitive sense array 125b to match that of the active stylus 130b when the active stylus 130b is in use. In one embodiment, the capacitive sense array 125b capacitively couples with the active stylus 130b, as opposed to conventional inductive stylus applications. It should also be noted that the same assembly used for the capacitive sense array 125b, which is configurable to detect touch objects 140b, is also used to detect and track a stylus 130b without an additional PCB layer for inductively tracking the active stylus 130b.

In the depicted embodiment, the processing device 110b includes analog and/or digital general purpose input/output ("GPIO") ports 107b. GPIO ports 107b may be programmable. GPIO ports 107b may be coupled to a Programmable Interconnect and Logic ("PIL"), which acts as an interconnect between GPIO ports 107b and a digital block array of the processing device 110b (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110b may also include memory, such as random access memory ("RAM") 105 and program flash 104b. RAM 105b may be static RAM ("SRAM"), and program flash 104b may be a non-volatile storage, which may be used to store firmware (e.g., control algorithms executable by processing core 102b to implement operations described herein). Processing device 110b may also include a memory controller unit ("MCU") 103b coupled to memory and the processing core 102b. The processing core 102b is a processing element configured to execute instructions or perform operations. The processing device 110b may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102b. In the case of the memory being external to the processing device, the processing device is coupled to the other device in which the memory resides as would be appreciated by one of ordinary skill in the art having the benefit of this disclosure.

The processing device 110b may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107b.

As illustrated, capacitance-sensing circuit 101b may be integrated into processing device 110b. Capacitance-sensing circuit 101b may include analog I/O for coupling to an external component, such as touch-sensor pad (not shown), capacitive sense array 125b, touch-sensor slider (not shown), touch-sensor buttons (not shown), and/or other devices. The capacitance-sensing circuit 101b may be configurable to measure capacitance using mutual-capacitance sensing techniques, self-capacitance sensing technique, charge coupling techniques or the like. In one embodiment, capacitance-sensing circuit 101b operates using a charge accumulation circuit, a capacitance modulation circuit, or other capacitance sensing methods known by those skilled in the art. In an embodiment, the capacitance-sensing circuit 101b is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101b in any chosen combination. In one embodiment, the TX and RX electrodes of the sense array 125b are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 101 does not use mutual-capacitance or self-capacitance sensing to measure capacitances of the sense elements when performing a stylus sensing. Rather, the capacitance-sensing circuit 101b measures a charge that is capacitively coupled between the sense array 125b and the stylus as described herein. The capacitance associated with the intersection between a TX electrode and an RX electrode can be sensed by selecting every available combination of TX electrode and RX electrode. When a touch object, such as a finger, gloved finger or stylus, approaches the capacitive sense array 125b, the object causes a decrease in mutual capacitance between some of the TX/RX electrodes. In another embodiment, the presence of a finger increases the coupling capacitance of the electrodes. Thus, the location of the finger on the capacitive sense array 125b can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 100b may also include non-capacitive sense elements 170b coupled to the processing device 110b via bus 171b and GPIO port 107b. The non-capacitive sense elements 170b may include buttons, light emitting diodes ("LEDs"), and other user interface devices, such as a mouse, a keyboard, or other functional keys that do not use capacitance sensing. In one embodiment, buses 122b and 171b are embodied in a single bus. Alternatively, these buses may be configured into any combination of one or more separate buses.

Processing device 110b may include internal oscillator/clocks 106b and communication block ("COM") 108b. In another embodiment, the processing device 110b includes a spread spectrum clock (not shown). The oscillator/clocks block 106b provides clock signals to one or more of the components of processing device 110b. Communication block 108b may be used to communicate with an external component, such as a host processor 150b, via host interface ("I/F") line 151b. Alternatively, processing device 110b may also be coupled to embedded controller 160b to communicate with the external components, such as host processor 150b. In one embodiment, the processing device 110b is configurable to communicate with the embedded controller 160b or the host processor 150b to send and/or receive data.

Processing device 110b may reside on a common carrier substrate such as, for example, an integrated circuit ("IC") die substrate, a multi-chip module substrate, or the like. Alternatively, the components of processing device 110b may be one or more separate integrated circuits and/or discrete components. In one exemplary embodiment, processing device 110b is the Programmable System on a Chip (PSoC®) processing device, developed by Cypress Semiconductor Corporation, San Jose, Calif. Alternatively, processing device 110b may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110b may also be done in the host.

Capacitance-sensing circuit 101b may be integrated into the IC of the processing device 110b, or alternatively, in a separate IC. Alternatively, descriptions of capacitance-sensing circuit 101b may be generated and compiled for incorporation into other integrated circuits. For example, behavioral level code describing the capacitance-sensing circuit 101b, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101b.

It should be noted that the components of electronic system 100b may include all the components described above. Alternatively, electronic system 100b may include some of the components described above.

In one embodiment, the electronic system 100b is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

FIG. 1C is a diagram of one embodiment of a computer system suitable to affect the techniques of the present application. As may be seen in this embodiment, the computer system 100c may store touch position/size modules at different locations and stores with the computer system 100*c*. For example, the techniques of the present application may be affected by hardware, firmware, software—or any combination of the above. Touch position/size module 126*c* may be affected in the processing device 102*c*, stored in system memory 104*c* or as instructions stored on computer-readable media in secondary storage 118*c*.

Within the computer system 100*c* is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 100*c* includes a processing device 102*c*, a main memory 104*c* (e.g., read-only memory (ROM), flash memory, dynamic random access memory (DRAM) such as synchronous DRAM (SDRAM) or DRAM (RDRAM), etc.), a static memory 106*c* (e.g., flash memory, static random access memory (SRAM), etc.), and a secondary memory 118*c* (e.g., a data storage device in the form of a drive unit, which may include fixed or removable computer-readable storage medium), which communicate with each other via a bus 130*c*.

Processing device 102*c* represents one or more general-purpose processing devices such as a microprocessor, central processing unit, or the like. More particularly, the processing device 102*c* may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 102*c* may also be one or more special-purpose processing devices such as an application specific integrated circuit (ASIC), a field programmable gate array (FPGA), a digital signal processor (DSP), network processor, or the like. Processing device 102*c* is configured to execute the instructions 126*c* for performing the operations and steps discussed herein.

The computer system 100*c* may further include a network interface device 122*c*. The computer system 100*c* also may include a video display unit 110*c* (e.g., a liquid crystal display (LCD) or a cathode ray tube (CRT)) connected to the computer system through a graphics port and graphics chipset, an alphanumeric input device 112*c* (e.g., a keyboard), a cursor control device 114*c* (e.g., a mouse), and a signal generation device 120*c* (e.g., a speaker).

The secondary memory 118*c* may include a machine-readable storage medium (or more specifically a computer-readable storage medium) 124*c* on which is stored one or more sets of instructions 126*c* embodying any one or more of the methodologies or functions described herein. In one embodiment, the instructions 126*c* include instructions for the techniques of the present application. The instructions 126*c* may also reside, completely or at least partially, within the main memory 104*c* and/or within the processing device 102*c* during execution thereof by the computer system 100*c*, the main memory 104*c* and the processing device 102*c* also constituting machine-readable storage media.

The computer-readable storage medium 124*c* may also be used to store the instructions 126*c* persistently. While the computer-readable storage medium 124*c* is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 126*c*, components and other features described herein can be implemented as discrete hardware components or integrated in the functionality of hardware components such as ASICS, FPGAs, DSPs or similar devices. In addition, the instructions 126*c* can be implemented as firmware or functional circuitry within hardware devices. Further, the instructions 126*c* can be implemented in any combination of hardware devices and software components.

Figure 2:
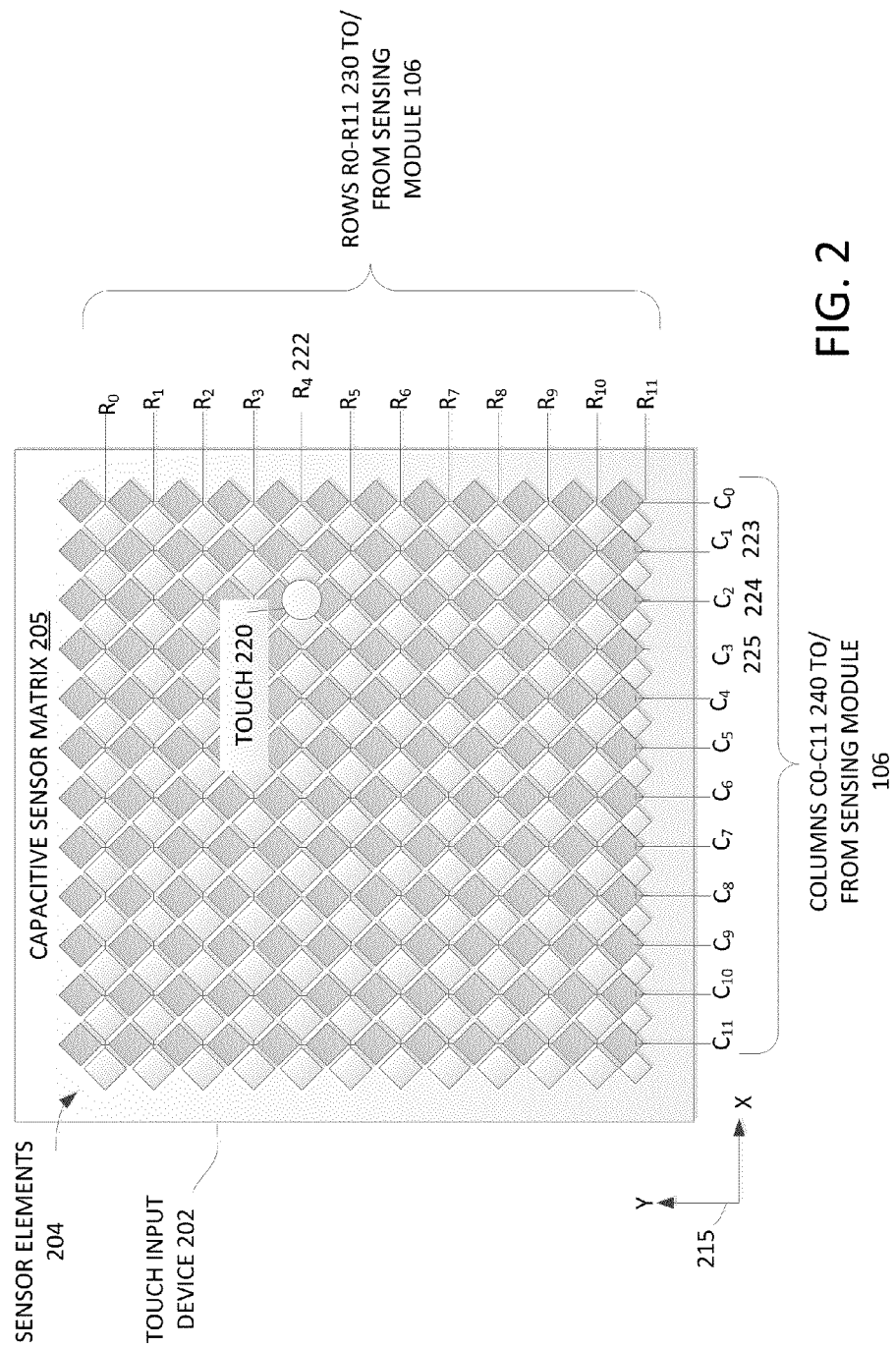
FIG. 2 is a block diagram illustrating a touch input device including a capacitive sensor matrix, in accordance with various embodiments.

An example touch input device and the arrangement of its sensor elements are now discussed with respect to FIG. 2. FIG. 2 is a block diagram illustrating a touch input device 202 including a capacitive sensor matrix 205, in accordance with various embodiments. FIG. 2 includes rows R0-R11 230 and d columns C0-C11 240 of sensor elements 204 arranged in a matrix. The rows R0-R11 230 and the columns C0-C11 240 of sensor elements 204 are shown to be coupled with the sensing module 106. In scan operations described in more detail below, each of the rows R0-R11 230 and each of the columns C0-C11 240 of sensor elements may operate as both transmit and receive electrodes.

In the capacitive sensor matrix 205, each of the rows R0-R11 230 of the sensor elements 204 is shown to cross with each of the columns C0-C11 240 of the sensor elements 204. In an embodiment, galvanic isolation is maintained between the rows R0-R11 230 and the columns C0-C11 240. In an embodiment, each of the columns C0-C11 240 may be associated with an X-coordinate of the X-Y plane 215 and each of the rows R0-R11 230 may be associated with a Y-coordinate of the X-Y plane 215.

Although the sensor elements 204 are shown to be diamond shaped, one or more of the sensor elements 204 may be formed of other shapes (e.g., lines, triangles, snowflakes, and/or any other shape) and be organized in various other patterns (e.g., intersections, concentric circles, saw tooth pattern, Manhattan pattern, and/or other patterns) without departing from the claimed subject matter. The sensor elements 204 may comprise all or a portion of the surface area of the touch input device 202. The sensor elements 204 and patterns of the sensor elements 204 may be formed through one or more layers of the touch input device 202.

A touch 220 is shown relative to the sensor elements 204 where a conductive object is placed relative touch input device 202. As will be discussed below beginning with FIG. 3, the sensing module 106 may operate in one or more scan modes and/or scan one or more portions of the capacitive sensor matrix 205 for sensor signals that reflect changes in capacitance is response to touch input such as the touch 220.

Figure 3:
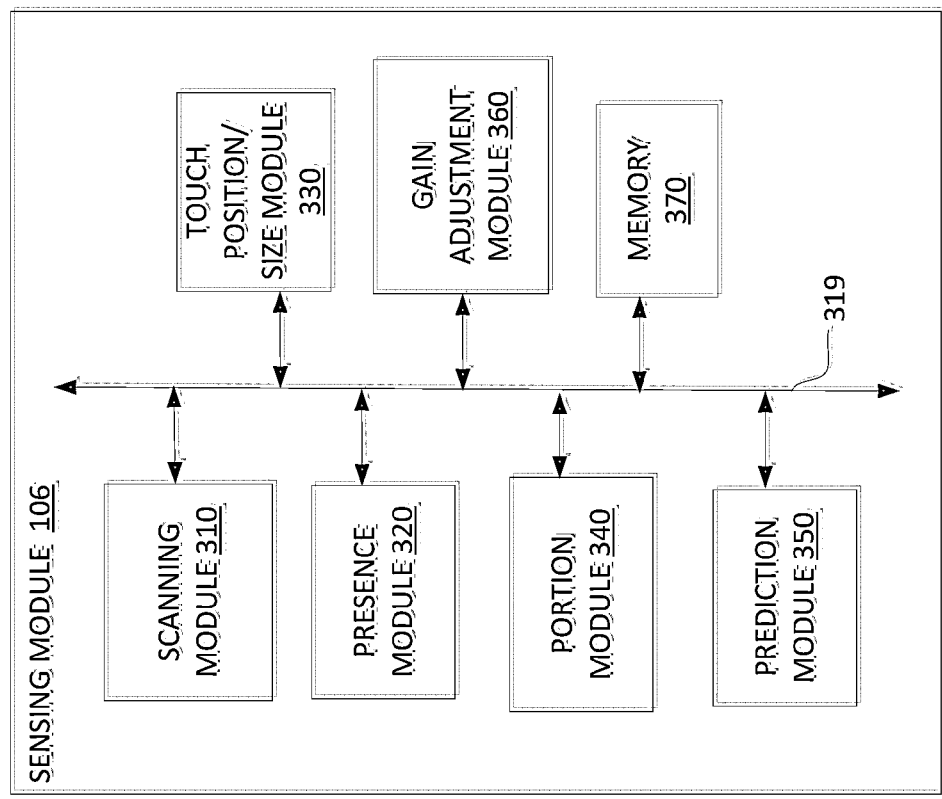
FIG. 3 is a block diagram illustrating a sensing module, in accordance with embodiments.
Figure 3:
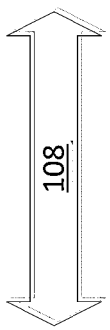

FIG. 3 is a block diagram illustrating a sensing module 106 of FIG. 2, in accordance with embodiments. The sensing module 106 may include a scanning module 310, a gain adjustment module 360, a presence module 320, a touch position/size module 330, a portion module 340, a prediction module 350, and a memory 370 coupled to one another through a bus 319, any of which may be implemented using hardware, software, or a combination of hardware and software.

In an embodiment, the scanning module 310 scans the sensors elements 204 of the touch input device 202 for sensor signals and the presence module can determine, based on the sensor signals, whether a conductive object is proximate to or in contact with the touch input device 202. When the presence module 320 detects the presence of a conductive object, the touch position/size module 330 may evaluate a representation of the detected presence to determine a position of the conductive object. In an example scan operation, the scanning module 310 excites one or more of the sensor elements 204 and then receives, from the same or other of the sensor elements 204, a sensor signal that reflects a capacitance associated with the excited one or more sensor elements 204 and associated touch object. The scanning module 310 may include an analog-to-digital converter (not shown) to convert the sensor signal, which in this embodiment are analog capacitance values, to a digital representation of capacitance value. The presence module 320 can then detect presence of a conductive object if, for example, the digital capacitance value meets a threshold equivalent capacitance or falls within upper and lower threshold levels.

The sensor signal may reflect a self-capacitance between one or more of the sensor elements 204 and a ground reference (not shown). For example, the scanning module 310 may excite (e.g., apply a signal to) a transmit electrode (e.g., the row R4 222 of FIG. 2) and then receive a sensor signal through a receive electrode (e.g., the row R4 222) that represents the self-capacitance between the row R4 222 and the ground reference. In an embodiment, the presence module 320 can detect the presence of the touch 220 through row R4 222, based on a difference between the measured self-capacitance when the touch 220 is not present and the measured self-capacitance when the touch 220 is present. This is an example of an axial scan mode in which a sensor signal of each scanned electrode can indicate presence of an input object relative to that electrode but does not indicate where along the electrode the presence is located.

The sensor signal that reflects the capacitance, introduced above and coupled to ground, may reflect a mutual capacitance between two or more of the sensor elements 204. Referring again to FIG. 2, the scanning module 310 may excite a transmit electrode (e.g., row R4 222) and then receive a sensor signal through a receive electrode (e.g., column C2 224) that represents a mutual capacitance between the sensor electrodes at the intersection of the transmit channel (e.g., row R4 222) and the receive channel electrode (e.g., column C2 224). The presence module 320 can detect the presence of the touch 220 based on the measured mutual capacitance when the touch 220 is not present and the measured mutual capacitance when the touch 220 is present. This is an example of an all points addressable scan mode in which the change in mutual capacitance of each scanned transmit-receive electrode intersection can indicate presence at that intersection.

In an embodiment, the scanning module 310 can operate in an axial scan mode through sensing mutual capacitance between transmit-receive electrode intersections. Referring to FIG. 2, for example, the scanning module 310 can simultaneously excite multiple transmit electrodes (e.g., rows R0-R11 230) and then receive a sensor signal through a receive electrode (e.g., the column C2 224) that reflects a baseline mutual capacitance between the sensor elements adjacent to each intersection between the multiple transmit electrodes (e.g., rows R0-R11 230) and the receive electrode (e.g., the column C2 224). When the touch 220 is present, the sensor signal will be less than the baseline mutual capacitance due to proximity of the input object. In an embodiment, the presence module 320 can detect the presence of the touch 220 relative to column C2 224 based on this decrease below the baseline mutual capacitance.

The scanning module 310 can repeat this procedure, simultaneously exciting the transmit electrodes (e.g., the rows R0-R11 230) and sequentially or simultaneously receiving sensor signals for the remaining of the receive electrodes (e.g., the columns C0-C11 240). Based on the change in measured signal, the presence module 320 can then determine, as described above, whether an input object is proximate to those receive electrodes.

Each receive electrode (e.g., the columns C0-C11 240) is associated with a position coordinate (e.g., an X-coordinate) along an axis. The touch position/size module 330 can determine the position coordinate (e.g., the X-coordinate) of a touch as the position coordinate of the electrode where the peak sensor signal, for example, is observed. Alternatively or additionally, the touch position/size module 330 may determine the position coordinate of the touch through finding the centroid of sensor signals distributed over multiple adjacent receive electrodes (e.g., columns C1 223, C2 224, and C3 225). The scanning module 310 can switch the designation of transmit and receive electrodes between the rows R0-R11 230 and the columns C0-C11 240 such that the presence module 320 and touch position/size module 330 can detect presence and determine position (e.g., X-Y position) along multiple axes (e.g., in the X-Y plane 215 of FIG. 2).

The scanning module 310 can operate in a balanced scan mode, which is one example of a mutual capacitance axial scan. In an example balanced scan mode, the scanning module 310 simultaneously drives half of the transmit electrodes (e.g., the rows R0-R5) true and the other half (e.g., the rows R6-R11) 180-degrees out of phase. When the transmit electrodes are simultaneously excited, the sensor signals on the receive electrode are larger and can more accurately reflect the presence of a touch. When a 1-mm diameter stylus is to be detected, sensor signals that more accurately reflect presence of a touch can be useful. When there is a touch proximate to a transmit-receive electrode intersection, the scanning module 310 can demodulate a received sensor signal to output either a positive or negative current value, depending on whether the touch falls along the transmit electrodes driven with a true excitation signal or the transmit electrodes driven 180-degrees out of phase. If the touch falls (e.g., on a split) between the transmit electrodes driven true and the transmit electrodes driven 180-degrees out of phase, the touch can go undetected. For this reason, the scanning module 310 may provide a second scan in which two split points between true and complement driven transmit electrodes are used to allow detection of a touch not detected through the first scan.

The scanning module 310 may include or utilize a multiplexer or switch matrix (not shown) to distribute excitation signals to one or more selected transmit electrodes where the selected electrodes are a subset of the total set of available transmit electrodes. Likewise, the scanning module 310 may include or utilize the same or a different multiplexer (not shown) to receive current from one or more selected receive electrodes. In this way, the scanning module 310 can scan selected portions or areas (e.g., targeted portions) of the capacitive sensor matrix 205 in an axial scan mode and/or an all points addressable scan mode for presence of an input object.

In an embodiment, the presence module 320 determines whether a measured signal profile indicates the presence of a stylus or a finger. In embodiments, a signal profile includes digitized representations of one or more sensor signals associated with a conductive object proximate to the touch input device 202. Embodiments describing detection of a stylus by the presence module 320 are discussed with respect to FIG. 4. As will be discussed with respect to FIG. 5, if a finger and a stylus are applied to the touch input device 202 at the same time, the presence module 320 can detect, through an axial scan, the presence of the stylus along one axis (e.g., the Y-axis) but may fail to detect the stylus along the other axis (e.g. the X-axis). In an embodiment, if the presence module 320 detects a presence of a stylus in one axis but not the other, the presence module 320 may signal the portion module 340 to define or determine a targeted portion of the touch input device 202 upon which the scanning module 310 should perform another scan operation (e.g., an all points addressable scan or reduced area balanced scan). Defining and scanning targeted portions of the touch input device 202 are described in more detail beginning with the discussion of FIG. 6. The presence module 320 can use the results of the scan of the targeted portion to detect the presence of the stylus on the axis where presence was not detected through the axial scan.

Figure 4:
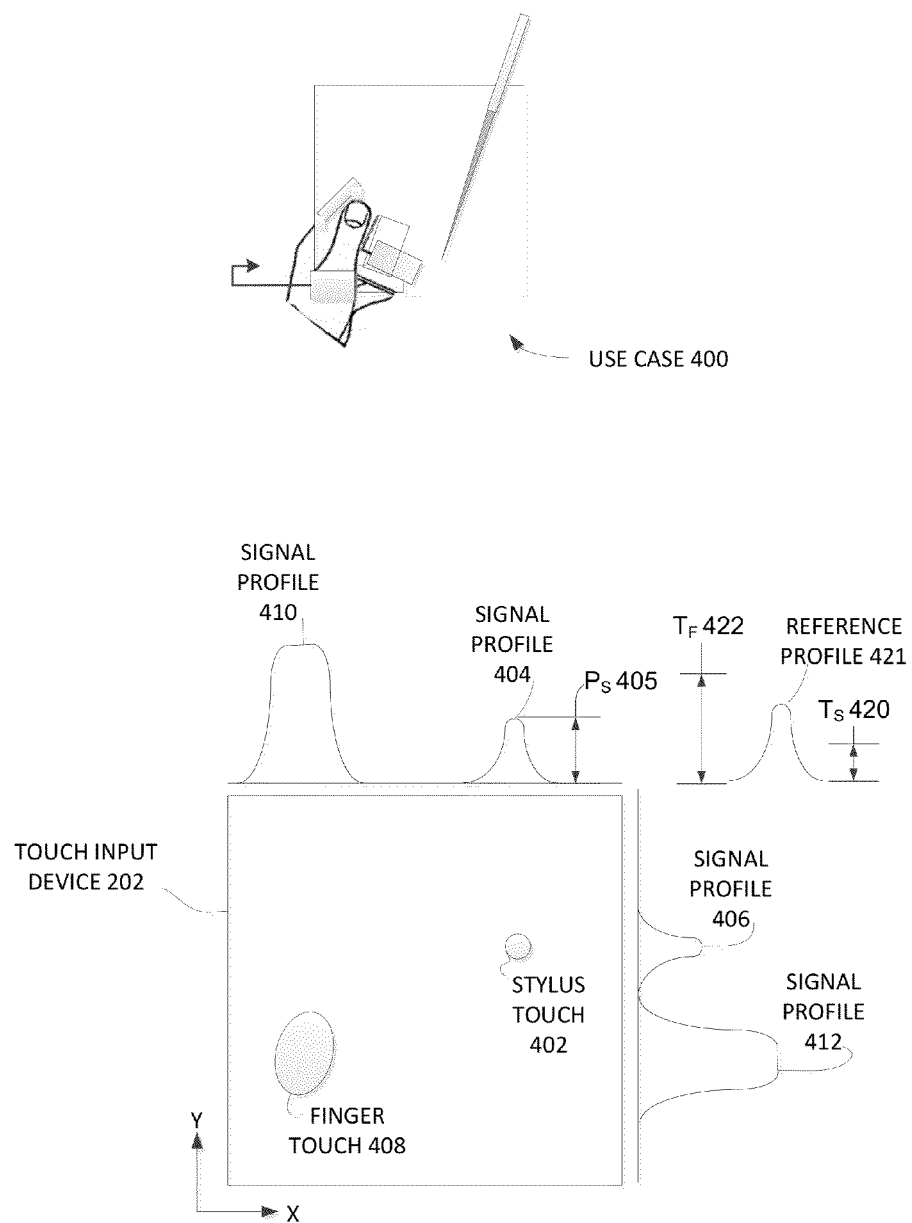
FIG. 4 is a block diagram illustrating a touch input use case and corresponding signal profiles received through an axial scan mode, in accordance with an embodiment.

For some use cases, including the one described with respect to FIG. 4, the sensing module 106 can detect the presence of an object—e.g. a finger or a stylus—in two axes through an axial scan mode. FIG. 4 is a block diagram illustrating a touch input use case 400 and corresponding signal profiles received through an axial scan mode, in accordance with an embodiment.

FIG. 4 includes the stylus touch 402 and the finger touch 408 relative to the touch input device 202. The presence module 320 of FIG. 3 can observe the signal profiles 410 and 412 reflecting the finger touch 408 and the signal profiles 404 and 406 reflecting the stylus touch 402 after the scanning module 310 performs axial scans. To determine whether a signal profile indicates a stylus touch, the presence module 320 may compare the observed signal profiles 404 and 406 with one or more reference signal profiles (e.g., within a range of a reference signal profile) that are representative of a stylus touch. If the presence module 320 determines that an observed signal profile has a level of similarity to a reference signal profile, the presence detector may determine that the observed signal profile indicates a stylus touch. The level of similarity may be selected to suit a performance target such as detection confidence. A reference signal profile 421 may include digitized representations of one or more reference sensor signals. A range of a reference signal profile 421 may include multiple reference signal profiles between upper and lower threshold values. For example, the finger threshold value, TF 422 may represent the upper threshold value and the stylus threshold value TS 420 may represent the lower threshold value. Digitized representations of sensor signals between the finger threshold value, TF 422 and the stylus threshold value TS 420 can be considered to be within a range of a reference signal profile 421.

With respect to FIG. 4, since the finger touch 408 and the stylus touch 402 are spaced apart on the X-axis and the Y-axis, the signal profiles 410 and 412 of the finger touch 408 do not interfere with or obscure the signal profiles 404 and 406 of the stylus touch 402. Thus, the presence module 320 can observe unobstructed signal profiles 404 and 406 of the stylus touch 402 and correctly detect, through comparison with the reference signal profile 421, the presence of the stylus touch 402 along both the X-axis and the Y-axis.

For example, to detect a presence of a stylus along an axis, the presence module 320 may compare a minimum peak (e.g., the peak, PS 405) with the finger threshold value, TF 422 and the stylus threshold value TS 420. The finger threshold value, TF 422 is the decision point between an input object being a stylus or a very small finger. The stylus threshold value TS 420 is the minimum detection limit of the stylus. In some embodiments the presence module 320 may use hysteresis, touch history, and maximum traveling distance of a touch to improve the reliability and confidence of associations between signal profiles and styli.

Once the presence module 320 has confirmed the presence of the stylus touch 402, the touch position/size module 330 can then determine the X-Y coordinates of the stylus touch 402 using either the signal profiles 404 and 406, or if these signals are of insufficient signal to noise ratio from a subsequent targeted scan of the area identified by signal profiles 404 and 406. The presence and location of the finger touch 408 may be ignored or otherwise processed by the sensing module 106 of FIG. 3.

Embodiments for Object Position and/or Size Determination

As a touch screen device is typically used with a sensed input and response, it may be desirable to increase the accuracy and improve linearity of the response of the device. In one embodiment of the present application, accuracy may be improved by calculating finger position coordinates in order to provide, or otherwise obtain, a smooth and reliable trajectory for finger tracking. It may also be desirable for the device to be robust to handle a variety of finger sizes and to handle the case of touches near edges or corners of the touch screen.

In another embodiment, it is possible to employ a method that may tend to improve the linear response of the device by employing a priori information comprised of one or more finger response functions (e.g., reference templates).

In yet another embodiment, direct manipulation of such a touch screen device system may estimate the touch coordinates by processing the reaction of a capacitance panel with a finger (e.g. as provided by touch sensor) as well as potentially using a priori information about the finger shape. Such a system may further comprise a training phase and a touch coordinates estimation phase.

In several embodiments, systems, methods and techniques are disclosed herein that determine the position of an object that is touching a touch-sensitive display panel. These embodiments may comprise a set of reference templates—where each reference template is a model and/or data associated with a reference object of a given size. The reference templates may aid these embodiments to determine the position of a touching object—as the touching object produces an actuation signal from the touch-sensitive display when substantially touching, and/or in proximity with, the touch display.

The actuation signal from the display may be compared against a threshold value. If it is below a threshold value, the actuation signal may be ignored as primarily noise. Otherwise, the actuation signal from the touching object may be used to determine the position of the object by solving equations that may be functions of these reference templates. As mentioned herein, the reference templates may be made from a priori information—and derived from—e.g., a training phase, or a modeling step. The training phase may be performed by stepping an object across a touch display and noting its actuation signal—while the modeling step may be performed by calculating actuation signals based on a model of objects of a given size.

In one embodiment, the present system may comprise two phases: a training phase and a coordinate estimation phase; wherein during the training phase the system estimates the reference templates (e.g., finger response functions) for a set of exemplary fingers using either: (1) simulated mutual capacitance reactions provided by electromagnetic field simulation software (e.g., ANSYS Maxwell, COMSOL Multiphysics Engineering Simulation Software, etc.) or (2) experimental data.

In the case of obtaining experimental data, a set of finger positions may be tested by using an artificial finger (i.e., one that may simulate the capacitive or other physical traits of the human figure on a touch display) and employ some constant step motor. The constant step motor may be able to bring the artificial finger into communication with the touch display via its sensors, and the sensed value of a concrete cell may be recorded as output information. This sensed data may be used to obtain the finger response as a function of the finger's coordinate. Further, the system may perform a coordinate estimation phase in which the system may use a boundary method for variably sized fingers (e.g. 9 mm and more) and typical displays (e.g., 5 mm pitch size) and the finger response function may be thus described as an equation.

Figure 5:
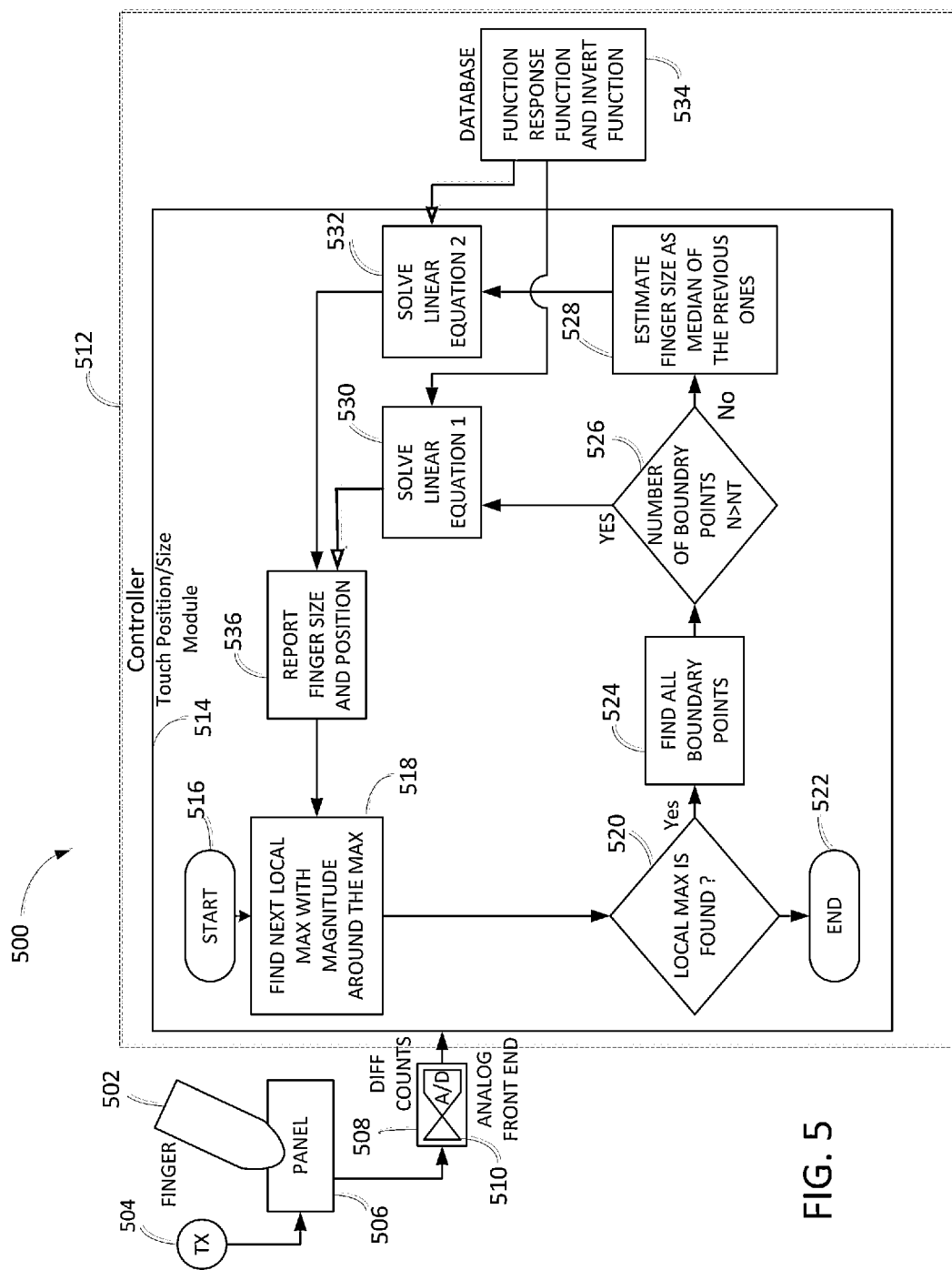
FIG. 5 depicts one embodiment of a touch screen system made in accordance with the principles of the present application.

FIG. 5 is one embodiment of a touch screen device 500 as made in accordance with the principles of the present application. Device 500 may comprise a touch screen display 506, an analog front end 508, which may further an analog to digital converter 510 and a controller 512. Controller 512 receives the sensor data from sensor cells that comprise touch display 506. The sensor data may be the touch display's reaction to a human user's touch (as denoted as 502) or some other sensory input or I/O data 504. In reference to FIG. 1B, touch screen display 506 may comprise display 125b in FIG. 1B—and analog front end 508 may comprise sensing circuit 106.

It will be appreciated that controller 512 may comprise the configurations of FIGS. 1B, 1C and/or any suitable combination of features thereof. In particular, controller 512 comprises the processing, memory and I/O resources (as recited in any of these embodiments) sufficient to carry out the techniques—or implement the modules—as described herein. Controller 512 may further comprise touch position/size module 514 which, as discussed above, may reside in any suitable computer system as hardware, firmware, software— or any combination thereof.

Even though many of the embodiments described herein may be drawn to capacitive touch screen technologies, it should be appreciated that the present system and associated methods may be employed on any technology for touch screens known—e.g., capacitive (for example, surface, projected, mutual, self or other), resistive, optical imaging, surface acoustic wave, infrared grid, acoustic pulse. It may suffice for the purposes of the present application that an object such as a user's finger may be modeled—either theoretically or through experimental data—in a meaningful fashion for the particular touch technology modality.

As described in greater detail herein, controller 512 may affect a touch position/size module 514. In many embodiments, controller 512 may comprise the processing device 110b in FIG. 1B and touch position/size module 514 may comprise computer readable instructions stored in system memory, e.g., such as in program flash 104b or RAM 105b or the like. In another embodiment, controller 512 may comprise processing system 100c in FIG. 1C and touch position/ size module 514 may comprise computer readable instructions in system memory—e.g., instructions 126c found at the processing device 102c, main memory 104c, secondary memory 118c and/or static memory 106c. It will be appreciated that other embodiments are possible and are encompassed under the scope of the present application.

In addition, controller 512 may further use effective a priori models of various finger response functions. Such models may be obtained in a few ways: (1) from simulated and/or calculated potential responses from fingers of various sizes or (2) from measured finger responses from a testing phase. Such a testing phase may include automatically stepping through a series of "finger" presses on the display. The "finger" may be an animate or inanimate object that has a similar response that a human finger might have with the touch screen. The step testing may proceed methodically through a two-dimensional grid of point to discern the touch display's reaction. Different sized "fingers" may be employed and the resulting data may form a "reference template" for that particular size. Such data and/or reference templates may optionally be stored in database 534—or in any other computer readable media (e.g., RAM, ROM, external storage or the like). Likewise, the modeled and/or computer finger response function may also be stored as a reference template—or stored as values in any computer readable storage known in the art.

For example, in FIG. 5, system 500 may be employing an obtained finger response function (e.g., a reference template obtained from experimental observation) stored in database 534. Such a reference template may be obtained in a the training phase which may use Simulated Mutual Capacitance Reactions provided by electromagnetic field simulation software, or may use experimental data.

Figure 6:
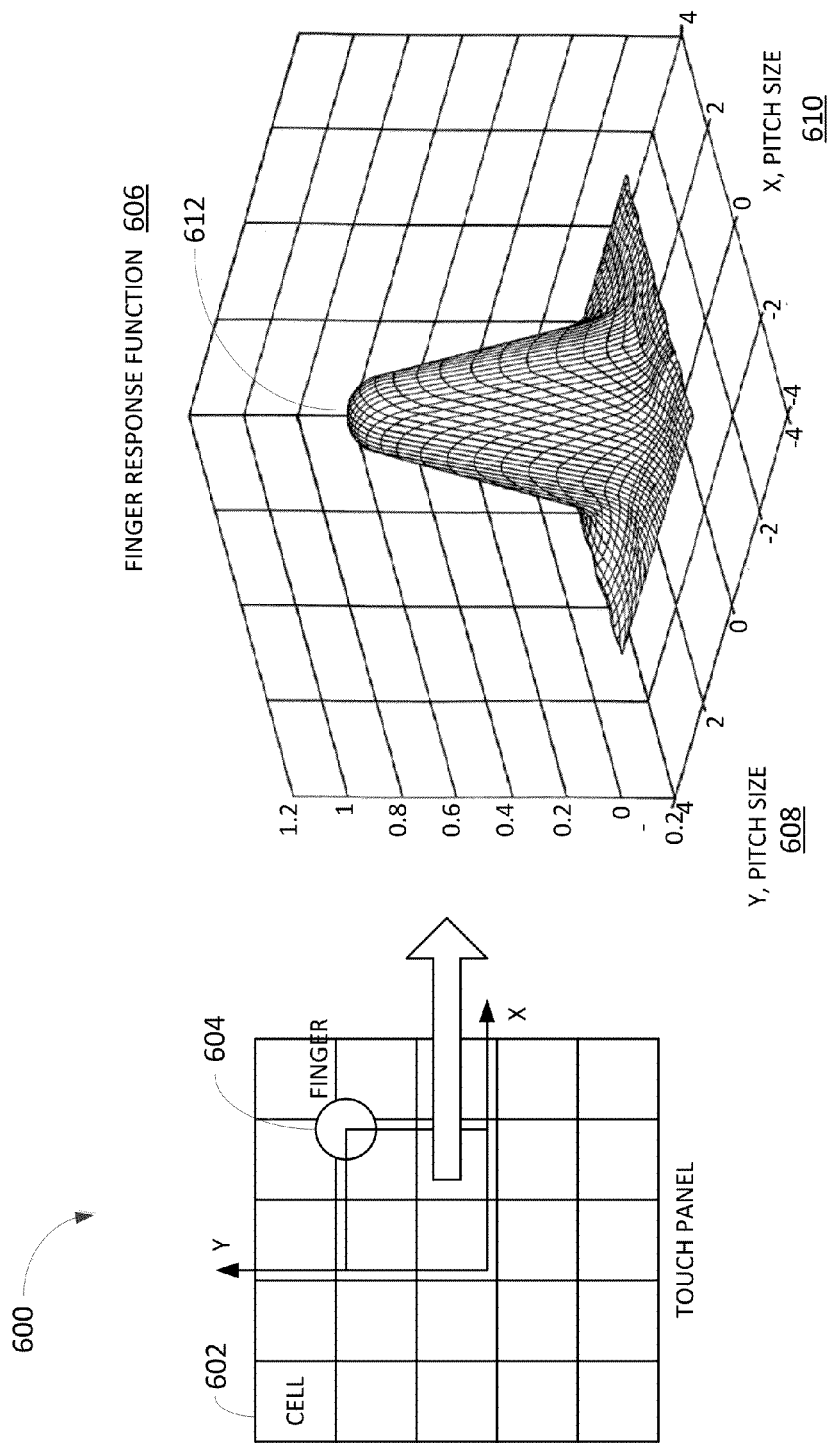
FIG. 6 shows one embodiment of a method of calculating big finger size response functions into a device similar to that shown in FIG. 1.

FIG. 6 depicts a reference model for a finger touch 604, as produced by concrete (and/or sensor) cells 602 upon a touch screen 600. The reference model, as described herein, may be derived from experimental data or from modeled data. In this example, touch screen 600 receives input from finger 604 and such input may be modeled as finger response function 606. The exemplary finger response function may comprise a response curve 612, characterized by a pitch size in the Y-direction 608 and in the X-direction 610. Such information may be provided in a priori manner about the finger's response shape—and may be stored as in FIG. 5 in database 534 (or any other computer readable storage). This information may be further input to controller 512 to obtain more reliable finger position coordinates from analog front end 508 during the touch coordinate estimation phase, as discussed herein.

It should be appreciated that, while FIG. 5 depicts a touch screen enabled touch display system, the systems, methods and principles of the present application may also find application in other object recognition systems and/or platforms— e.g., tablets, laptops, mini-tablets, smart devices or any device utilizing touch technology. Touch screen finger responses may possibly be substituted by suitable other I/O responses— e.g., stylus response or the like. Thus, where the application discusses touch gestures (such as a finger trajectory), it may be possible to duplicate such finger response with another I/O response for a suitable object recognition system (e.g., that may not be finger generated).

Various System Embodiments

Figure 7:
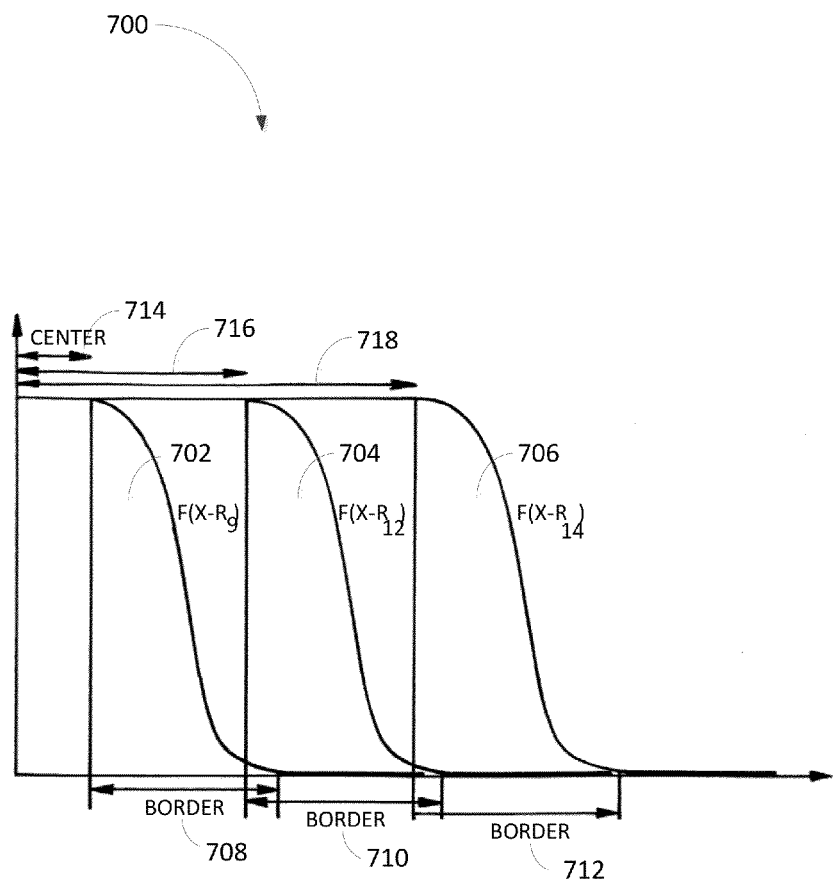
FIG. 7 shows different embodiments of finger response functions in cross sectional view for various finger sizes.

In one embodiment, the present system may use a training phase to estimate reference templates. FIG. 7 depicts a set of reference templates (700) for a set of fingers (e.g. 702, 704 and 706) of various sizes (e.g., 9 mm, 12 mm and 14 mm respectively). As mentioned, these reference templates may be generated by software-simulated reactions (e.g., mutual capacitance) as modeled by electromagnetic field simulation software—or via experimental data, as previously mentioned.

Training-Phase Finger Size Response Functions

During such a training phase, the system may test a set of finger positions of some incremental position upon a number of sensory cells. The output value of such sensory cells provides the finger response as a function of finger's coordinate as depicted in FIG. 6. For a variety of fingers (e.g. fingers 9 mm and greater) and typical sensory cell panels of approximately 5 mm pitch size, the finger response function may be symmetrical to the z-axis and thus may be described as:

$$F(x, y) = F\left(\sqrt{x^2 + y^2}\right)$$

There may be several potential differences between two finger sizes that may be of significance for the techniques described herein. For example, the center (e.g., 714, 716 and 718) may be one such difference. The center is the measure from the center of the detected finger push to the point where the finger push starts its fall-off. Another potential difference is the border (e.g., 708, 710 and 712). The border is that portion of the detected finger push which is from the edge of the center to the point where the finger push is no longer detected. It may be desirable to make some simplifying assumptions regarding finger push shapes that may aid in calculations—e.g., that most large fingers have essentially the same border shape, but perhaps shifted by some value.

For one embodiment, one such finger response functions may be described by the following mathematical function:

$$z = F(x-R)$$

where R is the central finger part radius

Structure of Boundary Method

Figure 8:
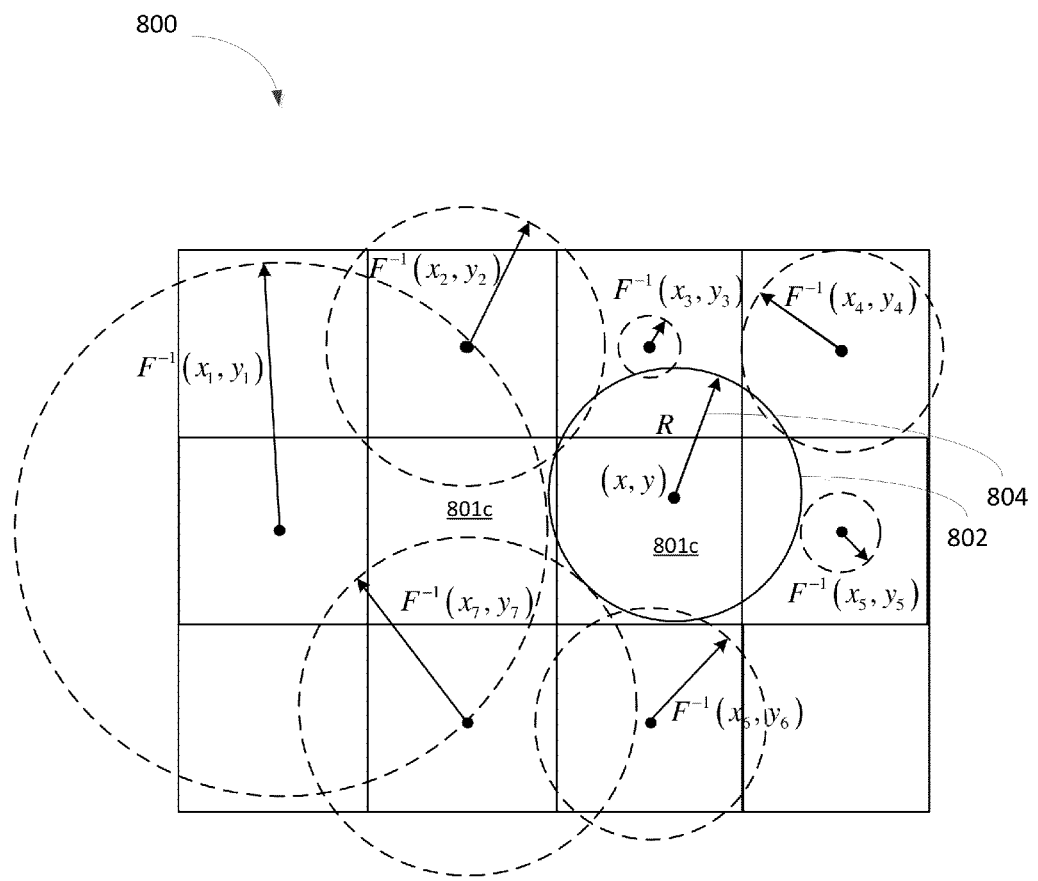
FIG. 8 shows one embodiment of a method for obtaining finger position.

FIG. 8 depicts one embodiment of the use of boundary points to determine the figure position and finger size of an unknown finger push upon a touch screen that may comprise a number of cells and/or sensors. As may be seen in FIG. 8, some cells may be characterized as "border" cells and "center" cells, as further discussed below.

In one embodiment, the boundary points may comprise the cells and/or sensors that substantially surround the actuation signal from an object touching the touch display. This may be seen in FIG. 8, as the boundary/border cells substantially surround the actuated/center cells.

To determine the position and size of the finger push, the controller may receive sensor data from the border cells. The controller may then start to compute the inverse functions from the border cells as described by:

$$x = F^{-1}(z) + R$$

where $F^{-1}(x)$ is the inverse function $F(x)$

Finger position may be estimated by minimizing the function:

$$f(x, y) = \sum_{i=1}^{N} \left(\sqrt{(x-x_i)^2 + (y-y_i)^2} - F^{-1}(x_i, y_i) - R\right)^2$$

Finger size may be estimated by:

$$R = \frac{1}{N} \sum_{i=1}^{N} \left(\sqrt{(x-x_i)^2 + (y-y_i)^2} - F^{-1}(x_i, y_i)\right)$$

In one embodiment, a minimization procedure may be characterized by nonlinear equations:

$$\frac{\delta f(x, y)}{\delta x} = 0; \frac{\delta f(x, y)}{\delta y} = 0.$$

For merely one example, there may be at least two basic approaches to solve such an equation. The first may use a numeric indirect or gradient descent approach to reach the solution of a nonlinear equation. The second may use a solution of an over-determined system of a linear equation. In a case of more than three boundary points, the system of nonlinear equations may be over-determined and may be linearized. In a case of unknown finger sizes, coordinates may be estimated by:

$$\begin{pmatrix} 2(x_1 - x_2) & 2(y_1 - y_2) & 2(F^{-1}(x_1, y_1) - F^{-1}(x_2, y_2)) \\ \ldots & \ldots & \ldots \\ 2(x_i - x_j) & 2(y_i - y_j) & 2(F^{-1}(x_i, y_i) - F^{-1}(x_i, y_j)) \\ \ldots & \ldots & \ldots \\ 2(x_N - x_{N-1}) & 2(y_N - y_{N-1}) & 2(F^{-1}(x_N, y_N) - F^{-1}(x_{N-1}, y_{N-1})) \end{pmatrix} \begin{pmatrix} x \\ y \\ R \end{pmatrix} == \quad \text{Equation 1}$$

$$\begin{pmatrix} F^{-1}(x_2, y_2)^2 - F^{-1}(x_1, y_1)^2 + x_1^2 - x_2^2 + y_1^2 - y_2^2 \\ \ldots \\ F^{-1}(x_i, y_i)^2 - F^{-1}(x_j, y_j)^2 + x_j^2 - x_i^2 + y_j^2 - y_i^2 \\ \ldots \\ F^{-1}(x_{N-1}, y_{N-1})^2 - F^{-1}(x_N, y_N)^2 + x_N^2 - x_{N-1}^2 + y_N^2 - y_{N-1}^2 \end{pmatrix},$$

where $i \neq j, i = \overline{1 \ldots N}, j = \overline{1 \ldots N}$.

To solve an unknown finger size, it may be possible to determine by solving:

$$\begin{pmatrix} 2(x_1 - x_2) & 2(y_1 - y_2) \\ \ldots & \ldots \\ 2(x_i - x_j) & 2(y_i - y_j) \\ \ldots & \ldots \\ 2(x_N - x_{N-1}) & 2(y_N - y_{N-1}) \end{pmatrix} \begin{pmatrix} x \\ y \end{pmatrix} == \quad \text{Equation 2}$$

-continued $$\begin{pmatrix} 2R(F^{-1}(x_2, y_2) - F^{-1}(x_1, y_1)) + F^{-1}(x_2, y_2)^2 - \\ F^{-1}(x_1, y_1)^2 + x_1^2 - x_2^2 + y_1^2 - y_2^2 \\ \ldots \\ 2R(F^{-1}(x_i, y_j) - F^{-1}(x_i, y_j)) + F^{-1}(x_i, y_i)^2 - \\ F^{-1}(x_j, y_j)^2 + x_j^2 - x_i^2 + y_j^2 - y_i^2 \\ \ldots \\ 2R(F^{-1}(x_{N-1}, y_{N-1}) - F^{-1}(x_N, y_N)) + \\ F^{-1}(x_{N-1}, y_{N-1})^2 - F^{-1}(x_N, y_N)^2 + \\ x_N^2 - x_{N-1}^2 + y_N^2 - y_{N-1}^2 \end{pmatrix}.$$

Schematically, FIG. 8 depicts a solution 800 of these linear equations by providing for a central finger circle 802 with unknown radius R 804 that may touch a set of circles (denoted as $F^{-1}(x_i, y_j)$, for $1 \leq i,j \leq 6$) at each boundary point with radii $F^{-1}(x, y)$. Center cells (as denoted 801c) are substantially where the actuation signal comes from as a result of an object touching the touch display. Other cells are considered to be border cells (not labeled in FIG. 8). As may be seen, substantially circular areas may be estimated or otherwise constructed from the inverse functions in the border cells. The minimization process as discussed would seek to minimize the overlap between the actuation signal detected in the center cells and the inverse functions produced by the border cells.

At the corners and edges where only a few border points may exist, another method and/or technique may be applied, where a known finger size may be used to then avoid unstable tracking results.

In another embodiment, a method of boundary estimation may use a finger size prediction tool. Because in some exemplary touch display devices (as in FIG. 6), there may exist zones on the display where it may not be recommended to update a finger size due to existence of only few boundary points. Within these the zones, a finger size may not be estimated with high accuracy. Thus, the number of boundary points may be chosen as the criteria of areas where the finger size estimators perform with low accuracy. In one embodiment where several border points are known, an estimate may be made of the finger size as the median of previous finger sizes.

In yet another embodiment, a method of border estimation may use a dynamic finger prediction algorithm, which may include time prediction of a finger size that may be based on a median filtration technique. If a number of points on a border is smaller than some desired number (e.g. 5 or less) or if a finger size rapidly increases/decreases in dimension by a desired amount (e.g., 10%), a known finger size equal to the median of the 10 previously estimated sizes may be used.

One Processing Embodiment

Returning to FIG. 5, the system may have the controller 512 operate according to the following method:

(1) Diff counts 510 (e.g., system reaction without base line) are input to controller 512.

(2) At the start, the controller may perform a search for a possible position of a finger on sensor 506. The controller may calculate the local maximum value 516 of the Raw Data 510 with magnitude larger than some possibly desired threshold and its coordinates.

(3) If no local maximum is found, stopping the controller 522 and reporting the absence of any fingers over the sensor. Otherwise, processing continues by advancing to the next stage 524.

(4) Estimating the number of boundary points 524.

(5) If the number of boundary points is smaller than some value NT (e.g. NT=3-5) 526, estimating the finger size as the median of the previous history 528 and estimating the coordinates (530 and 532) by solving Equation 2, or else estimating the finger size and coordinates by solving linear Equation 1.

(6) Reporting the finger size 536 and advancing to a second iteration.

Experimental Data

As may be seen, if local maximum does not found at 520 in FIG. 5—e.g., meet a threshold test, then the signal may be construed as noise—and may be ignored as such.

Figure 9:
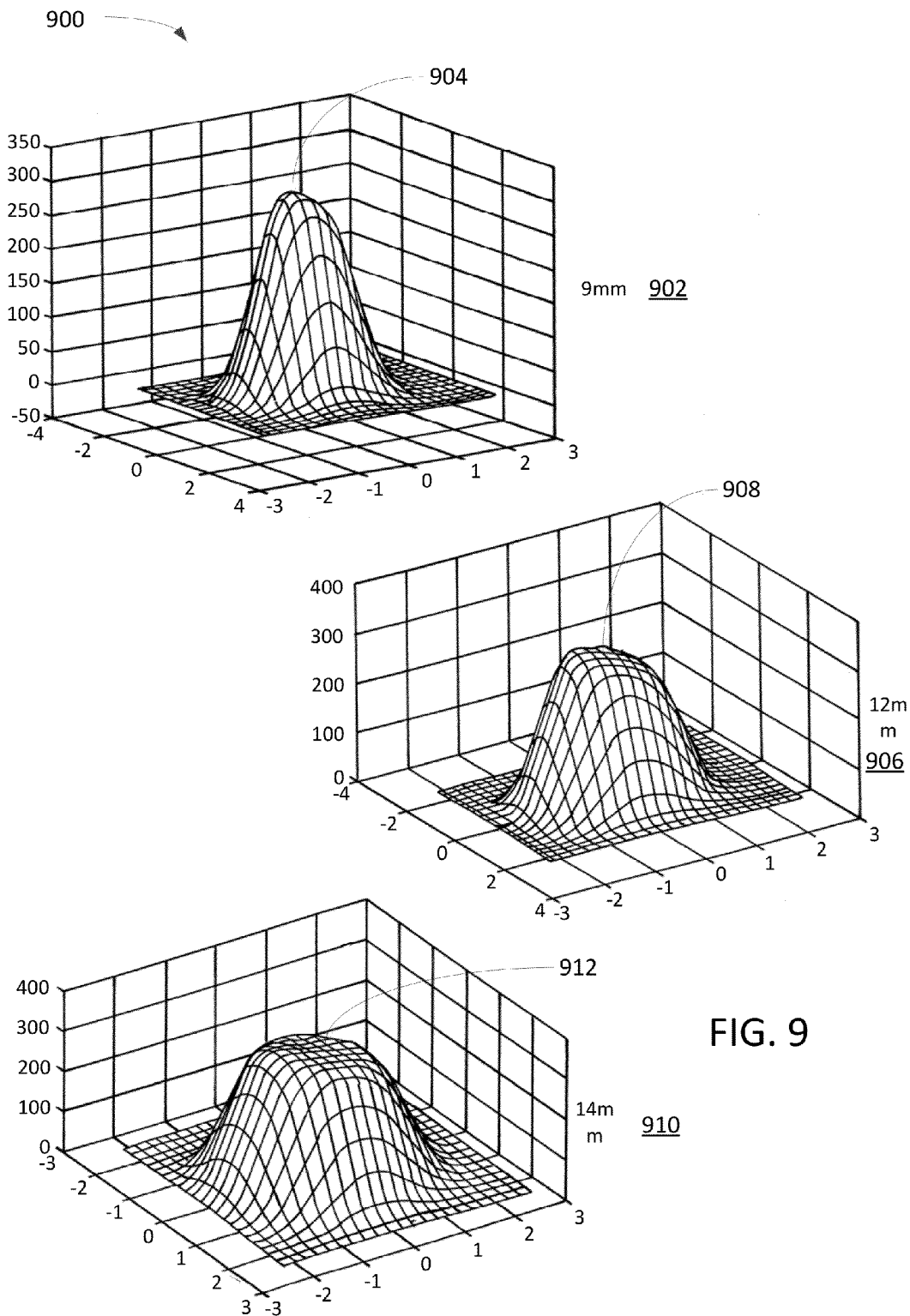
FIG. 9 depicts various finger response functions for fingers of 9, 12, and 14 mm diameters obtained by experimentation.

FIG. 9 depicts experimental data (900) received by a prototype of the present system on a 7×7 centroid method on a Dual Solid Diamond (DSD) display with a 4.7 mm pitch size. As seen, the controller depicted the following finger responses—904, 908 and 912 for 9, 12, and 14 mm finger sizes 902, 906, and 910 respectively, based on experimental inputs. It will be appreciated that other embodiments might get similar results—such as Single Solid Diamond (SSD), MH3, MH2, totem pole, SLIM and/or other structures. All of these and other known touch display structures are possible and contemplated under the scope of the present application.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "method") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for determining the position of an object on a touch sensitive display, the method comprising:
   receiving a set of reference templates, each reference template comprising data associated with an actuation signal initiated by a reference object touching the touch sensitive display;

receiving a first actuation signal, the first actuation signal associated with a touch produced by a first object upon the touch sensitive display;

determining whether the first actuation signal meets a desired local maximum signal value;

if the first actuation signal meets a desired local maximum signal value, determining a set of boundary points substantially near the first actuation signal;

receiving sensor data from the set of boundary points; and calculating a position of the first object; and wherein calculating the position further comprises computing a set of inverse functions from the set of boundary points, the set of inverse functions comprising a set of inverse finger response functions.

2. The method of claim 1 wherein the method further comprises:

creating the set of reference templates from a priori information associated with the reference object touching the touch sensitive display.

3. The method of claim 2 wherein creating the set of reference templates from a priori information associated with the reference object further comprises:

performing a training phase, wherein the training phase comprises a set of data from a given reference object, the given reference object comprising an associated size; and further wherein the training phase comprises receiving actuation data from the given reference object touching the touch-sensitive display at a set of coordinate points.

4. The method of claim 2 wherein creating the set of reference templates from a priori information associated with the reference object touching the touch sensitive display further comprises creating the set of reference templates from a set of modeling calculations, each modeling calculation comprises a function of size of reference object.

5. The method of claim 1 wherein determining whether the first actuation signal meets a desired local maximum value further comprises determining whether the actuation signal is above a noise threshold.

6. The method of claim 1 wherein determining the set of boundary points substantially near the first actuation signal further comprises determining a set of border cells substantially surrounding a set of center cells, the center cells sending actuation signals associated with the first object touching the touch display, wherein the touch display comprises a capacitive touch display.

7. The method of claim 6 wherein calculating the position of the first object further comprises:

receiving sensor data from the set of border cells; and computing a set of inverse functions from the border cells, the set of inverse functions comprising a set of inverse finger response functions.

8. The method of claim 6 wherein calculating the position of the first object further comprises solving a set of over-determined system of linear equations.

9. The method of claim 8 wherein calculating the position of the first object further comprises calculating a size of the first object comprising solving a set of over-determined system of linear equations.

10. A touch display system, comprising:

a touch-sensitive display; the touch-sensitive display comprising a set of sensor cells, each sensor cell capable of producing actuation signals when an object substantially touches the sensor cell;

a controller, the controller capable of receiving the actuation signals from the touch sensitive display; and the controller further comprises a processor, the processor capable of executing computer readable instructions for determining a position of the object, the object producing an actuation signal upon a touch sensitive display, the method comprising:

receiving a set of reference templates, each reference template comprising data associated with an actuation signal initiated by a reference object touching the touch sensitive display;

receiving a first actuation signal, the first actuation signal associated with a touch produced by a first object upon the touch sensitive display;

determining whether the first actuation signal meets a desired local maximum signal value;

if the first actuation signal meets a desired local maximum signal value, determining a set of boundary points substantially near the first actuation signal;

receiving sensor data from the set of boundary cells; and calculating a position of the first object; and wherein calculating the position further comprises computing a set of inverse functions from the boundary point, the set of inverse functions comprising a set of inverse finger response functions.

11. The touch display system of claim 10 wherein the computer readable instructions further comprises:

creating a set of reference templates from a priori information associated with a reference object touching the touch sensitive display.

12. The touch display system of claim 11 wherein the computer readable instructions further comprises:

performing a training phase, wherein the training phase comprises a set of data from a given reference object, the given reference object comprising an associated size; and further wherein the training phase comprises receiving actuation data from the given reference object touching the touch-sensitive display at a set of coordinate points.

13. The touch display system of claim 11 wherein the computer readable instructions further comprises:

creating a set of reference templates from a set of modeling calculations, each modeling calculation comprises a function of size of reference object.

14. The touch display system of claim 11 wherein the computer readable instructions further comprises:

determining a set of border cells substantially surrounding a set of center cells, the center cells sending actuation signals associated with the first object touching the touch display, wherein the touch display comprises a capacitive touch-sensitive display.

15. The touch display system of claim 14 wherein the computer readable instructions further comprises:

receiving sensor data from the set of border cells;

computing a set of inverse functions from the border cells, the set of inverse functions comprising a set of inverse finger response functions; and calculating the position of the first object from the set of inverse functions.

16. A method for determining the position of an object on a touch sensitive display, the method comprising:

receiving a set of reference templates, each reference template comprising data associated with an actuation signal initiated by a reference object touching the touch sensitive display and each reference object comprising a reference size;

receiving a first actuation signal, the first actuation signal associated with a touch produced by a first object at a position upon the touch sensitive display, the first object comprising a size;

determining whether the first actuation signal meets a desired local maximum signal value;

if the first actuation signal meets the desired local maximum signal value, determining a set of boundary points substantially near the first actuation signal;

receiving sensor data from the set of boundary points;

computing a set of inverse functions from the boundary points cells, the set of inverse functions comprising a set of inverse finger response functions; and calculating the position of the first object from the set of inverse functions.

17. The method of claim 16 wherein the method further comprises:

creating a set of reference templates from a priori information associated with a reference object touching the touch sensitive display.

18. The method of claim 17 wherein the method further comprises:

performing a training phase, wherein the training phase comprises a set of data from a given reference object, the given reference object comprising an associated size; and further wherein the training phase comprises receiving actuation data from the given reference object touching the touch-sensitive display at a set of coordinate points.

19. The method of claim 17 wherein the method further comprises:

creating a set of reference templates from a set of modeling calculations, each modeling calculation comprises a function of size of reference object.

20. The method of claim 11 wherein the method further comprises:

determining a set of border cells substantially surrounding a set of center cells, the center cells sending actuation signals associated with the first object touching the touch display;

receiving sensor data from the set of border cells;

computing a set of inverse functions from the border cells, the set of inverse functions comprising a set of inverse finger response functions; and calculating the position of the first object from the set of inverse functions.

* * * * *